US010601649B1

(12) United States Patent
Desai et al.

(10) Patent No.: US 10,601,649 B1
(45) Date of Patent: Mar. 24, 2020

(54) STACK SWITCHING DETECTION AND PROVISIONING

(71) Applicant: Cisco Technology, Inc., San Jose, CA (US)

(72) Inventors: Chiragkumar P. Desai, San Jose, CA (US); John Manuel Lau Moy, Belmont, CA (US); Chien-Hsun Wang, Pleasanton, CA (US); Prakash Jhurani, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 15/662,415

(22) Filed: Jul. 28, 2017

(51) Int. Cl.
  *H04L 29/06* (2006.01)
  *H04L 29/08* (2006.01)
  *H04L 12/24* (2006.01)

(52) U.S. Cl.
  CPC ...... *H04L 41/0806* (2013.01); *H04L 41/0859* (2013.01); *H04L 67/26* (2013.01); *H04L 41/0866* (2013.01)

(58) Field of Classification Search
  CPC . H04L 41/0806; H04L 41/0859; H04L 67/26; H04L 41/0866
  See application file for complete search history.

(56) References Cited

U.S. PATENT DOCUMENTS

| | | | | |
|---|---|---|---|---|
| 6,785,272 B1* | 8/2004 | Sugihara | ............ | H04L 41/0213 370/386 |
| 7,697,419 B1* | 4/2010 | Donthi | .................... | H04L 49/65 370/220 |
| 8,554,883 B2* | 10/2013 | Sankaran | ............ | H04L 41/0813 370/328 |
| 9,106,714 B2 | 8/2015 | Kumarasamy et al. | | |
| 9,286,047 B1* | 3/2016 | Avramov | .................. | G06F 8/61 |
| 2001/0033550 A1* | 10/2001 | Banwell | ............. | H04L 41/0213 370/254 |
| 2005/0271044 A1* | 12/2005 | Hsu | ......................... | H04L 12/40 370/360 |
| 2006/0092849 A1* | 5/2006 | Santoso | ................ | H04L 45/583 370/244 |
| 2007/0061813 A1* | 3/2007 | Beal | ........................ | G06F 9/445 718/105 |
| 2007/0157295 A1 | 7/2007 | Mangalore et al. | | |

(Continued)

*Primary Examiner* — Nicholas R Taylor
*Assistant Examiner* — Sanjoy K Roy
(74) *Attorney, Agent, or Firm* — Merchant & Gould P.C.

(57) ABSTRACT

Stack switching detection may be provided. First, a request to connect to a server may be received by the server from a first network device. Then the server may send, in response to receiving the request, a query to the first network device for a serial number of any other network device connected to the first network device. The first network device may have a first serial number. The server may receive, from the first network device, a response to the query. The response may include a second serial number corresponding to a second network device connected to the first network device. Next, the server may determine, based on the response, that the first network device and the second network device comprise a stack unit. The server may then provision the stack unit by provisioning the first network device and provisioning the second network device through the first network device.

20 Claims, 3 Drawing Sheets

(56) References Cited

U.S. PATENT DOCUMENTS

2009/0245137 A1* 10/2009 Hares .................... H04L 41/046
　　　　　　　　　　　　　　　　　　　　　　370/254
2014/0254432 A1* 9/2014 Jagannathan ....... H04L 41/0806
　　　　　　　　　　　　　　　　　　　　　　370/255
2016/0043902 A1* 2/2016 Liang ................. H04L 12/4625
　　　　　　　　　　　　　　　　　　　　　　370/254

* cited by examiner

STACK SWITCHING DETECTION AND PROVISIONING

TECHNICAL FIELD

The present disclosure relates generally to network provisioning.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet. Client address based forwarding of dynamic host configuration protocol response packets.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
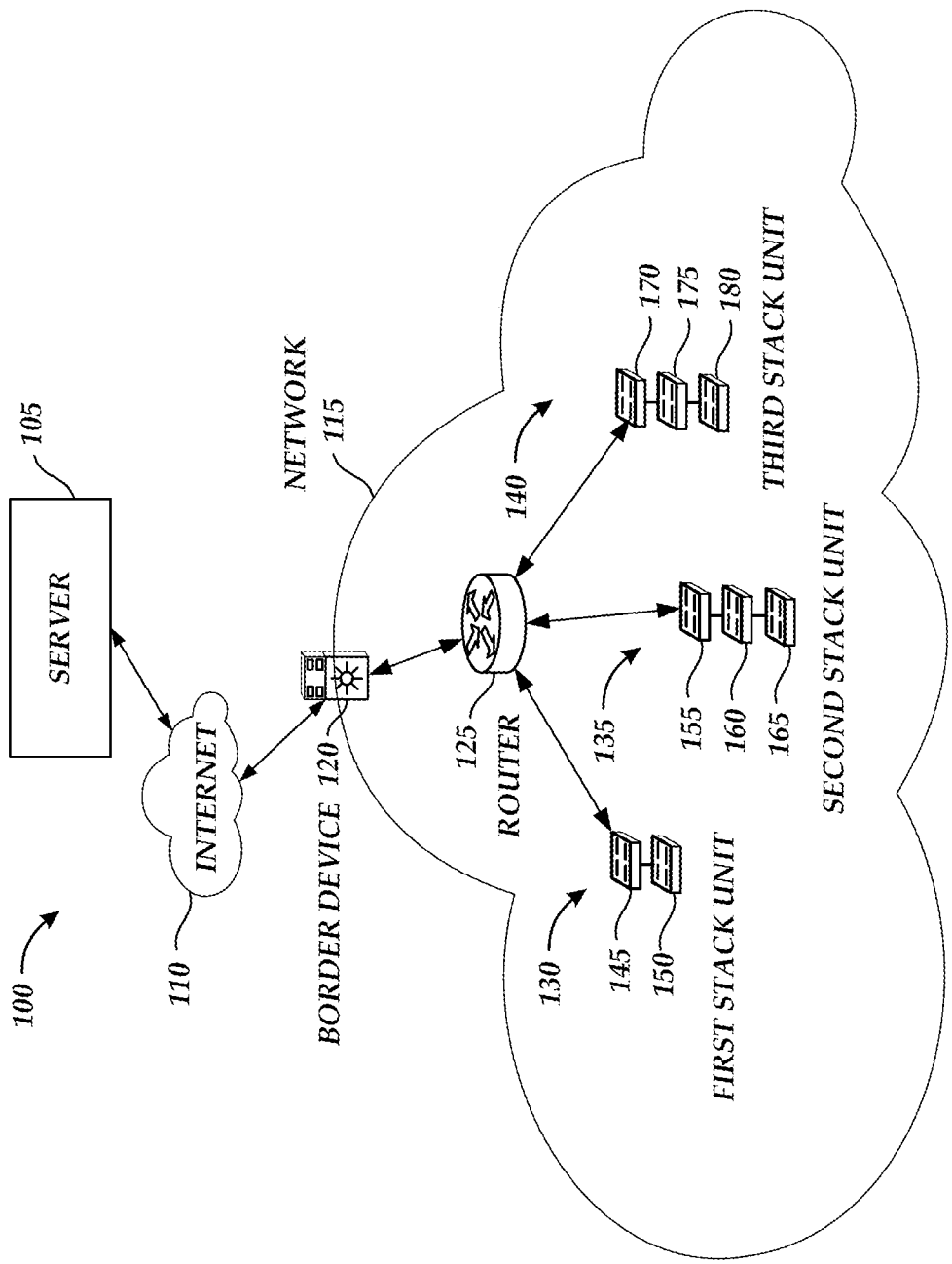
FIG. 1 shows a system for providing stack switching detection.

Stack switching detection may be provided. First, a request to connect to a server may be received by the server from a first network device. Then the server may send, in response to receiving the request, a query to the first network device for a serial number of any other network device connected to the first network device. The first network device may have a first serial number. The server may receive, from the first network device, a response to the query. The response may include a second serial number corresponding to a second network device connected to the first network device. Next, the server may determine, based on the response, that the first network device and the second network device comprise a stack unit. The server may then provision the stack unit by provisioning the first network device and provisioning the second network device through the first network device.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

When building and maintaining a fabric network, network operators may spend a lot in resource costs to deploy and provision network devices like routers, switches, access points, etc. These high resource costs may be a direct result, for example, of the involved complexity, human labor, travel, and staging costs to provision network devices. These costs may be particularly high for stack switching units due to the involved complexity in provisioning them. For example, stack switching units (i.e., stack units) can be configured to operate in three, five, or nine network devices forming stacks for more port density and throughput. Conventional systems do not have the capability to fully automate "day 0" network provisioning of stack switching units.

A fabric network may comprise a network topology in which components pass data to each other through interconnecting network nodes (e.g., devices). Fabric networks comprise overlay and underlay. The underlay may deal with connectivity between fabric network devices and the overlay may deal with user traffic transiting the fabric network. The fabric network overlay may comprise functional components such as fabric edge (FE) devices, fabric intermediate devices, fabric border (FB) devices, and a map resolver/server. The FE devices and FB devices, for example, of a fabric network may comprise stack switching units (i.e., stack units) each comprising more than one network devices configured in a stack.

In the fabric network overlay, FE devices may comprise, for example, Locator/ID Separation Protocol (LISP) xTR nodes and FB devices may comprise, for example, LISP pxTR nodes. End points (e.g., client devices including hosts) may be attached to the FE devices. The end points may be in endpoint identification (EID) space with each endpoint having an EID. Devices in the fabric network (e.g., FE devices and FB devices) may be configured with an address (e.g., a locator address). FE devices may register discovered EIDs (from the end points) with a fabric host-tracking database running on the map resolver/server associating the discovered EID to, for example, the configured locator address of the FE device that discovered it.

When a local FE device receives a packet from a local end point destined to a remote end point (i.e., on a remote FE device) whose location is not known, the local FE device may send a map request message to the map resolver/server. Once the local FE device receives a reply message back from the map resolver/server associating the unknown EID to the remote locator address, all subsequent traffic from the local end point may be encapsulated (e.g., LISP encapsulated) and forwarded to the remote locator address (i.e., remote FE device). Once the encapsulated packet is received on the remote FE device, the remote FE device may decapsulate the packet and forward natively (e.g., to the remote endpoint).

FB devices may connect the fabric network to the native routing domain. FB devices may be configured, for example, as LISP pxTR nodes and may provide a default gateway service to the FE nodes. Communication may happen through the FB device configured, for example, as a LISP pxTR node. When an FE device receives a packet from a local end point destined to a host outside the fabric network in the native routing domain, the FE device may encapsulate and send the packet to the FB device. The FB device may provide, for example, the LISP pxTR functionality and advertise itself as a next-hop address for all the fabric managed EID prefixes to the native routing domain so that it can steer the traffic.

FIG. 1 shows a system 100 consistent with embodiments of the disclosure for providing stack switching detection. As shown in FIG. 1, system 100 may comprise a server 105, a first network (e.g., Internet 110), and a second network (e.g., network 115). Server 105 may comprise, but is not limited to an Application Policy Infrastructure Controller (APIC). With respect to network 115, server 105 may provide centralized access to all fabric information, optimize the application lifecycle for scale and performance, and support flexible application provisioning across physical and virtual resources. Server 105 may be implemented using computing device 300 as described in greater detail below with respect to FIG. 3.

Network 115 may comprise a border device 120, a router 125, a first stack unit 130, a second stack unit 135, and a third stack unit 140. First stack unit 130 may comprise a first network device 145 and a second network device 150. Second stack unit 135 may comprise a third network device 155, a fourth network device 160, and a fifth network device 165. Third stack unit 140 may comprise a sixth network device 170, a seventh network device 175, an eighth network device 180, a ninth network device 182, a tenth network device 184, an eleventh network device 186, a twelfth network device 188, a thirteenth network device 190, and a fourteenth network device 192. Each one of first network device 145, second network device 150, third network device 155, fourth network device 160, fifth network device 165, sixth network device 170, seventh network device 175, eighth network device 180, ninth network device 182, tenth network device 184, eleventh network device 186, twelfth network device 188, thirteenth network device 190, and fourteenth network device 192 may comprise, but are not limited to, a switch or a router for example. Network 102 may comprise any number of stack units and each stack unit may comprise any number of network devices.

Network 115 may comprise a fabric network. The fabric network may comprise an underlay and an overlay. The underlay may deal with connectivity between fabric elements and the overlay may deal with user traffic entering the fabric. Traffic may enter the fabric network (i.e., network 115) through FE devices (e.g., first stack unit 130, second stack unit 135, and third stack unit 140). The traffic may be routed through network 115 via one (e.g., router 125) or a plurality of intermediate network devices within the plurality of network devices. The FE devices may be responsible for encapsulating a packet with a fabric header that contains an egress FE device address. When a packet (e.g., frame) arrives at the egress FE device, a fabric header may be stripped off and the native packet may be forwarded according to an inner address. The fabric network may be capable of providing layer-2 and layer-3 services on top of the underlay.

The fabric network (i.e., network 115) may have endpoints connected to first stack unit 130, second stack unit 135, and third stack unit 140. These endpoints may comprise any type device wishing to communicate over network 115. For example, each of the endpoints may comprise, but are not limited to, a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

First stack unit 130, second stack unit 135, and third stack unit 140 may each function as FE devices on network 115. First stack unit 130, second stack unit 135, and third stack unit 140 may each comprise multiple, individual network devices that form their corresponding respective stacks to provide, for example, more port density and throughput. First stack unit 130, second stack unit 135, and third stack unit 140 may form horizontal or vertical stack depending on front or back cabling for example.

Figure 2:
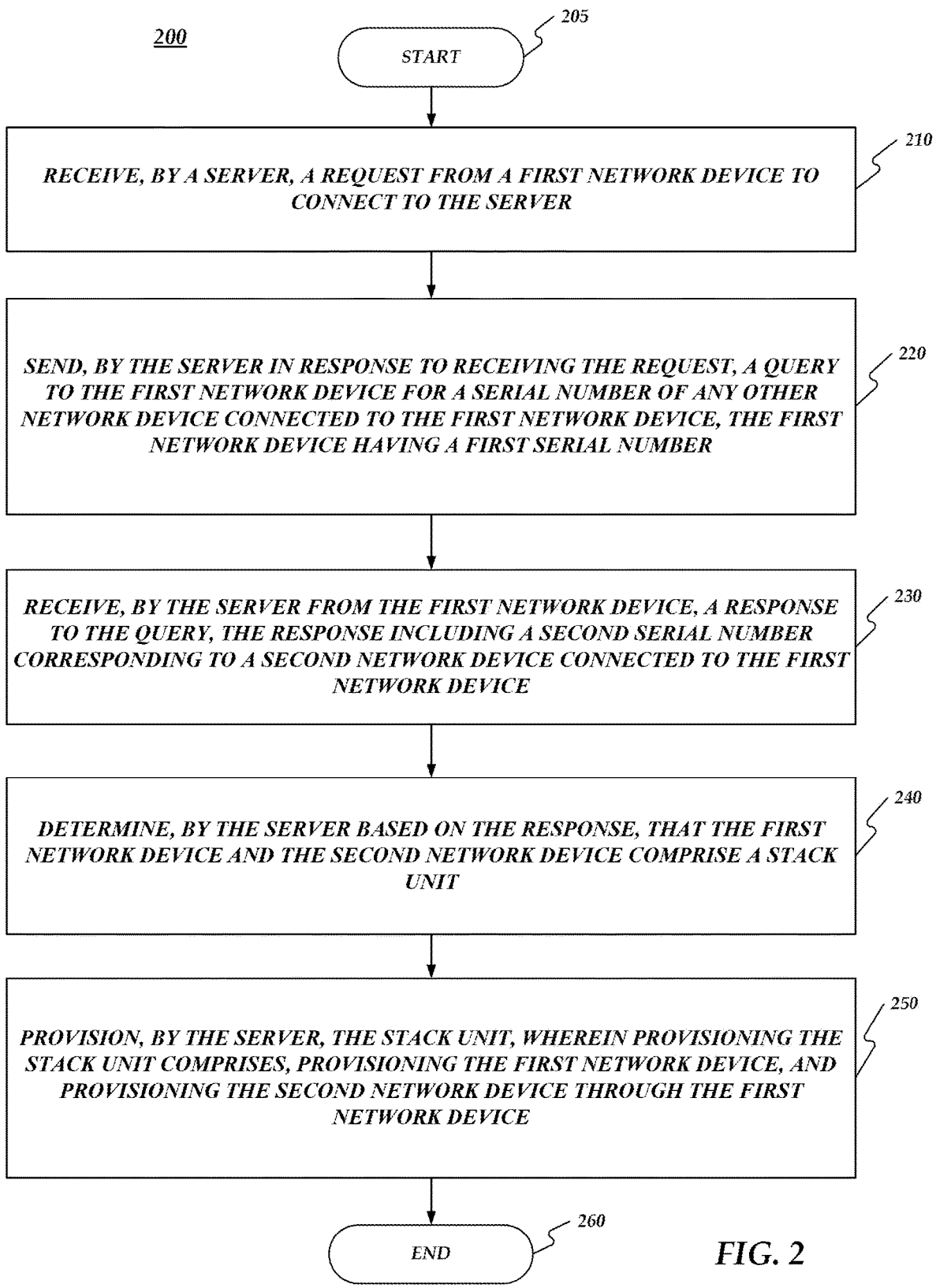
FIG. 2 is a flow chart of a method for providing stack switching detection.

FIG. 2 is a flow chart setting forth the general stages involved in a method 200 consistent with an embodiment of the disclosure for providing stack switching detection. Method 200 may be implemented using a server 105 as described in more detail below with respect to FIG. 1. Ways to implement the stages of method 200 will be described in greater detail below. Server 105 may be implemented using computing device 300 as described in greater detail below with respect to FIG. 3.

Method 200 may begin at starting block 205 and proceed to stage 210 where server 105 may receive a request from first network device 145 to connect to server 105. Stack switching units (i.e., stack units) can be configured to operate in three, five, or nine network devices forming stacks for more port density and throughput. Conventional systems do not have the capability to fully automate day 0 network provisioning of stack switching units. There are two major problems that embodiments of the disclosure may solve: 1) detection of stack wise switching units; and 2) automatically correcting software version/image and software license on stack switching unit members. For example, first network device 145 may include, for example, a plug and play (PNP) software agent that may attempt to connect to server 105 when first network device 145 is first booted up. At this point, server 105 may not yet know whether first network device 145 is part of a stack switching unit or not.

From stage 210, where server 105 receives the request from first network device 145 to connect to server 105, method 200 may advance to stage 220 where server 105 may send, in response to receiving the request, a query to first network device 145 for a serial number of any other network device connected to first network device 145. First network device may have a first serial number. For example, server 105 may have implemented intelligent logic to query first network device 145 for all possible serial numbers from connecting network devices (e.g., second network device 150). Correspondingly, first network device 145 may also have implemented intelligence to collect serial numbers for all booted stack switching unit members. Because first network device 145 may be the first to boot up, first network device 145 may become the "master" and the software agent running on the master may collect information about other connected members as and when they come up, including serial numbers. When the master (i.e., first network device 145) connects to server 105, server 105 may know that first network device 145 may be a device that could be part of potential stack. Accordingly, server 105 may query first network device 145 for further serial numbers and wait for other stack members (e.g., second network device 150) to come online based on query information.

Once server 105 sends the query to first network device 145 in stage 220, method 200 may continue to stage 230 where server 105 may receive, from first network device 145, a response to the query. The response may include a second serial number corresponding to second network device 150, which may be connected to first network device 145 forming first stack unit 130.

After server 105 receives the response to the query in stage 230, method 200 may proceed to stage 240 where server 105 may determine, based on the response, that first network device 145 and second network device 150 comprise a stack unit (i.e., first stack unit 130). For example, server 105 may use the response in such a way that server 105 may detect that first network device 145 is part of a stack unit or not. When server 105 detects that this is possible stack unit, server 105 may collect all stack members' serial numbers and tag this device (i.e., first stack unit 130) as a stack unit.

From stage 240, where server 105 determines that first network device 145 and second network device 150 comprise the stack unit (i.e., first stack unit 130), method 200 may advance to stage 250 where server 105 may provision the stack unit (i.e., first stack unit 130). Provisioning the stack unit may comprise provisioning first network device 145 and then provisioning second network device 150 through first network device 145. For example, all stack members can be provisioned automatically in a coherent fashion from the server 105. An administrator may not need to provision them separately as individual serial numbers/devices.

When network devices (e.g., first network device 145 and second network device 150) are ordered from a manufacturer, they may be each ordered as single devices. Later, they may be configured together to form a horizontal or vertical stack unit depending, for example, on front or back cabling. Since these network devices may be ordered as single devices, often times they come with different software images and software licenses on them. In addition, the stack unit master device and other individual stack member devices may be running different software images and/or software license level. Often times, these devices may also be pulled from shelves for re-use purposes, not knowing what image/licenses are running on them. When a stack unit is formed, stack unit members may not join a stack if they are not running homogenous software image or license level within a stack unit. The master device may show these other members in a member "mismatch" state and not part of functional stack unit yet.

With the process described above with respect to FIG. 2, server 105 may detect a stack as a single, coherent stack unit instead of a standalone switch. With this, server 105 may have full control of the active member (i.e., first network device 145) that is connected to it. By default, this active member may be the member booted first and has become the master. Server 105 may query the master device to learn about stack member devices that may not be running the same software image and/or license levels as the master device. Moreover, the master device may also auto-correct this software image and licenses by pushing them from server 105 automatically when provisioning this stack unit (i.e., first stack unit 130). This can bring up the entire first stack unit 130 as a coherent single unit with a uniform software image and license on each member device of first stack unit 130 (i.e., first network device 145 and second network device 150).

Consistent with embodiments of the disclosure, a user (e.g., an administrator) may specify a version (e.g., software or license) that may be required for a master. After that, server 105 may detect if any of the stack member devices are not on that specified version and either upgrades or downgrades the version for the stack member devices automatically to make them join the stack unit fully. This may happen without requiring the user's intervention. Once server 105 provisions the stack unit (i.e., first stack unit 130) in stage 250, method 200 may then end at stage 260. Consistent with embodiments of the disclosure, method 200 may be repeated for additional network devices in a stack unit.

Figure 3:
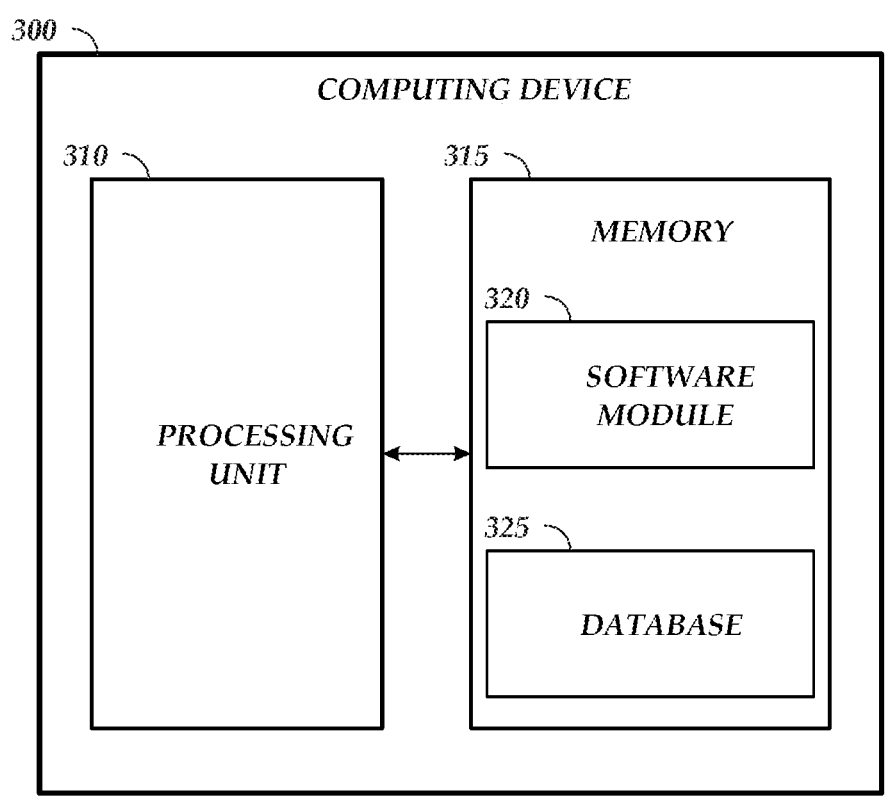
FIG. 3 shows a computing device.

FIG. 3 shows a computing device 300. As shown in FIG. 3, computing device 300 may include a processing unit 310 and a memory unit 315. Memory unit 315 may include a software module 320 and a database 325. While executing on processing unit 310, software module 320 may perform processes for providing stack switching detection, including for example, any one or more of the stages from method 200 described above with respect to FIG. 2. Computing device 300, for example, may provide an operating environment for any of server 105, first network device 145, second network device 150, third network device 155, fourth network device 160, fifth network device 165, sixth network device 170, seventh network device 175, eighth network device 180, ninth network device 182, tenth network device 184, eleventh network device 186, twelfth network device 188, thirteenth network device 190, and fourteenth network device 192. Server 105, first network device 145, second network device 150, third network device 155, fourth network device 160, fifth network device 165, sixth network device 170, seventh network device 175, eighth network device 180, ninth network device 182, tenth network device 184, eleventh network device 186, twelfth network device 188, thirteenth network device 190, and fourteenth network device 192 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a server, a request from a first network device to connect to the server;
   sending, by the server in response to receiving the request, a query to the first network device for a serial number of any other network device connected to the first network device, the first network device having a first serial number;
   receiving, by the server from the first network device, a response to the query, the response including a second serial number corresponding to a second network device connected to the first network device;
   determining, by the server based on the response, that the first network device and the second network device comprise a stack unit;
   tagging, in response to determining that the first network device and the second network device comprise the stack unit, the first serial number of the first device and the second serial number of the second device as the stack unit; and
   provisioning the stack unit, wherein provisioning the stack unit comprises:
      provisioning the first network device to a user defined configuration specified by a user for the stack unit, wherein the first network device is a first booted network device of the stack unit, and wherein the first network device is operative to auto-provision itself to the user defined configuration by pushing the user defined configuration from the server,
      determining, by the first network device of the stack unit, that the second network device does not comprises a same configuration as the first network device, and
      provisioning, in response to determining that the second network device does not comprise the same configuration as the first network device, the second network device to the same configuration as the first network device through the first network device by the first network device of the stack unit.

2. The method of claim 1, wherein provisioning the first network device comprises pushing a user defined software image version to the first network device when the server determines that the first network device is using a software image version different from the user defined software image version.

3. The method of claim 1, wherein provisioning the first network device comprises pushing a user defined software license level to the first network device when the server determines that the first network device is using a software license level different from the user defined software license level.

4. The method of claim 1, wherein provisioning the second network device comprises pushing, by the server, a same software image version as the first network device to the second network device through the first network device when the server determines that the second network device is using a software image level different from the first network device.

5. The method of claim 1, wherein provisioning the second network device comprises pushing, by the server, a same software license level as the first network device to the second network device through the first network device when the server determines that the second network device is using a software license level different from the first network device.

6. The method of claim 1, wherein tagging the first serial number of the first device and the second serial number of the second device as the stack unit comprises:
- collecting, by the server, the first serial number and the second serial number; and
- tagging the collected serial numbers as the stack unit.

7. An apparatus comprising:
- a memory storage; and
- a processing unit coupled to the memory storage, wherein the processing unit is operative to:
  - receive a request from a first network device;
  - send, in response to receiving the request, a query to the first network device for a serial number of any other network device connected to the first network device, the first network device having a first serial number;
  - receive, from the first network device, a response to the query, the response including a second serial number corresponding to a second network device connected to the first network device;
  - determine, based on the response, that the first network device and the second network device comprise a stack unit;
  - tag, in response to determining that the first network device and the second network device comprise the stack unit, the first serial number of the first device and the second serial number of the second device as the stack unit; and
  - provision the stack unit, wherein the processing unit being operative to provision the stack unit comprises the processing unit being operative to:
    - provision the first network device to a user defined configuration specified by a user for the stack unit, wherein the first network device is a first booted network device of the stack unit, and wherein the first network device is operative to auto-provision itself to the user defined configuration by pushing the user defined configuration from the server,
    - determine, by the first network device of the stack unit, that the second network device does not comprises a same configuration as the first network device, and
    - provision, in response to determining that the second network device does not comprise the same configuration as the first network device, the second network device to the same configuration as the first network device through the first network device by the first network device of the stack unit.

8. The apparatus of claim 7, wherein the processing unit being operative to provision the first network device comprises the processing unit being operative to push a user defined software image version to the first network device when the processing unit determines that the first network device is using a software image version different from the user defined software image version.

9. The apparatus of claim 7, wherein the processing unit being operative to provision the first network device comprises the processing unit being operative to push a user defined software license level to the first network device when the processing unit determines that the first network device is using a software license level different from the user defined software license level.

10. The apparatus of claim 7, wherein the processing unit being operative to provision the second network device comprises the processing unit being operative to push a same software image version as the first network device to the second network device through the first network device when the processing unit determines that the second network device is using a software image level different from the first network device.

11. The apparatus of claim 7, wherein the processing unit being operative to provision the second network device comprises the processing unit being operative to push a same software license level as the first network device to the second network device through the first network device when the processing unit determines that the second network device is using a software license level different from the first network device.

12. A computer-readable medium that stores a set of instructions which when executed perform a method executed by the set of instructions comprising:
- receiving, by a server, a request from a first network device to connect to the server;
- sending, by the server in response to receiving the request, a query to the first network device for a serial number of any other network device connected to the first network device, the first network device having a first serial number;
- receiving, by the server from the first network device, a response to the query, the response including a second serial number corresponding to a second network device connected to the first network device;
- determining, by the server based on the response, that the first network device and the second network device comprise a stack unit;
- tagging, in response to determining that the first network device and the second network device comprise the stack unit, the first serial number of the first device and the second serial number of the second device as the stack unit; and
- provisioning the stack unit, wherein provisioning the stack unit comprises:
  - provisioning the first network device to a user defined configuration specified by a user for the stack unit, wherein the first network device is a first booted network device of the stack unit, wherein the first network device is operative to auto-provision itself to the user defined configuration by pushing the user defined configuration from the server,
  - determining, by the first network device of the stack unit, that the second network device does not comprises a same configuration as the first network device, and provisioning, in response to determining that the second network device does not comprise the same configuration as the first network device, the second network device to the same configuration as the first network device through the first network device by the first network device of the stack unit.

13. The computer-readable medium of claim 12, wherein provisioning the first network device comprises pushing a user defined software image version to the first network device when the server determines that the first network device is using a software image version different from the user defined software image version.

14. The computer-readable medium of claim 12, wherein provisioning the second network device comprises pushing, by the server, a same software image version as the first network device to the second network device through the first network device when the server determines that the second network device is using a software image level different from the first network device.

15. The computer-readable medium of claim 12, wherein tagging the first serial number of the first device and the second serial number of the second device as the stack unit comprises:

collecting the first serial number and the second serial number; and tagging the collected serial numbers as the stack unit.

16. The computer-readable medium of claim 12, wherein the stack unit is an edge device.

17. The computer-readable medium of claim 12, wherein the first network device is operative to collect serial numbers and configuration information for each booted stack members of the stack unit.

18. The computer-readable medium of claim 12, wherein the second network device is a plug-and-play network device.

19. The computer-readable medium of claim 12, wherein the stack unit is operative to encapsulated a packet with a fabric header comprising an egress fabric edge device address.

20. The apparatus of claim 7, wherein the processing unit being operative to tag the first serial number of the first device and the second serial number of the second device as the stack unit comprises the processing unit being operative to:

collect the first serial number and the second serial number; and tag the collected serial numbers as the stack unit.

* * * * *